United States Patent [19]

Okano et al.

[11] Patent Number: 4,835,623
[45] Date of Patent: May 30, 1989

[54] SYSTEM FOR PLAYING VIDEO INFORMATION RECORDING DISKS, CAPABLE OF SPECIAL PLAYBACK MODE OPERATION WITH A CLV DISK

[75] Inventors: Takashi Okano; Toru Akiyama, both of Tokorozawa, Japan

[73] Assignee: Pioneer Electronic Corporation, Tokyo, Japan

[21] Appl. No.: 107,053

[22] Filed: Oct. 13, 1987

Related U.S. Application Data

[62] Division of Ser. No. 848,264, Apr. 4, 1986, Pat. No. 4,743,979.

[30] Foreign Application Priority Data

Apr. 5, 1985 [JP] Japan ................................ 60-073044

[51] Int. Cl.[4] .............................................. H04N 5/95
[52] U.S. Cl. .................................... 358/338; 358/339; 358/342
[58] Field of Search ............... 358/322, 338, 339, 342, 358/321, 322, 324; 360/36.2

[56] References Cited

U.S. PATENT DOCUMENTS 4,277,796 7/1981 Ross ................................... 358/322
4,313,129 1/1982 Fukui .
4,439,849 3/1984 Nabeshima ........................ 358/339
4,519,004 5/1985 Wilkinson et al. .
4,603,412 7/1986 Yamazaki .
4,608,610 8/1986 Tatsuguchi .
4,638,375 1/1987 Motoyama ......................... 358/338

Primary Examiner—Donald McElheny, Jr.
Attorney, Agent, or Firm—Fleit, Jacobson, Cohn & Price

[57] ABSTRACT

A video information playback system for playing the so called CLV disks which uses a digital video memory for enabling special playback mode operations such as the SLOW mode, the STILL mode, and the FAST mode. In order to simplify the construction of the system, a frequency of write and read clock signals used in the digital video memory is selected n times the horizontal synchronizing signal frequency. A time base servo control part of the system is controlled using a phase difference signal between a playback synchronizing signal and a reference signal whose frequency is 1/n time the frequency of the write and read clock signals. During a track jump operation for a special playback mode operation, a supply of the write clock signal and/or the read clock signal to the reference signal generator is stopped so that the phase difference is maintained constant before and after the track jump operation.

1 Claim, 7 Drawing Sheets

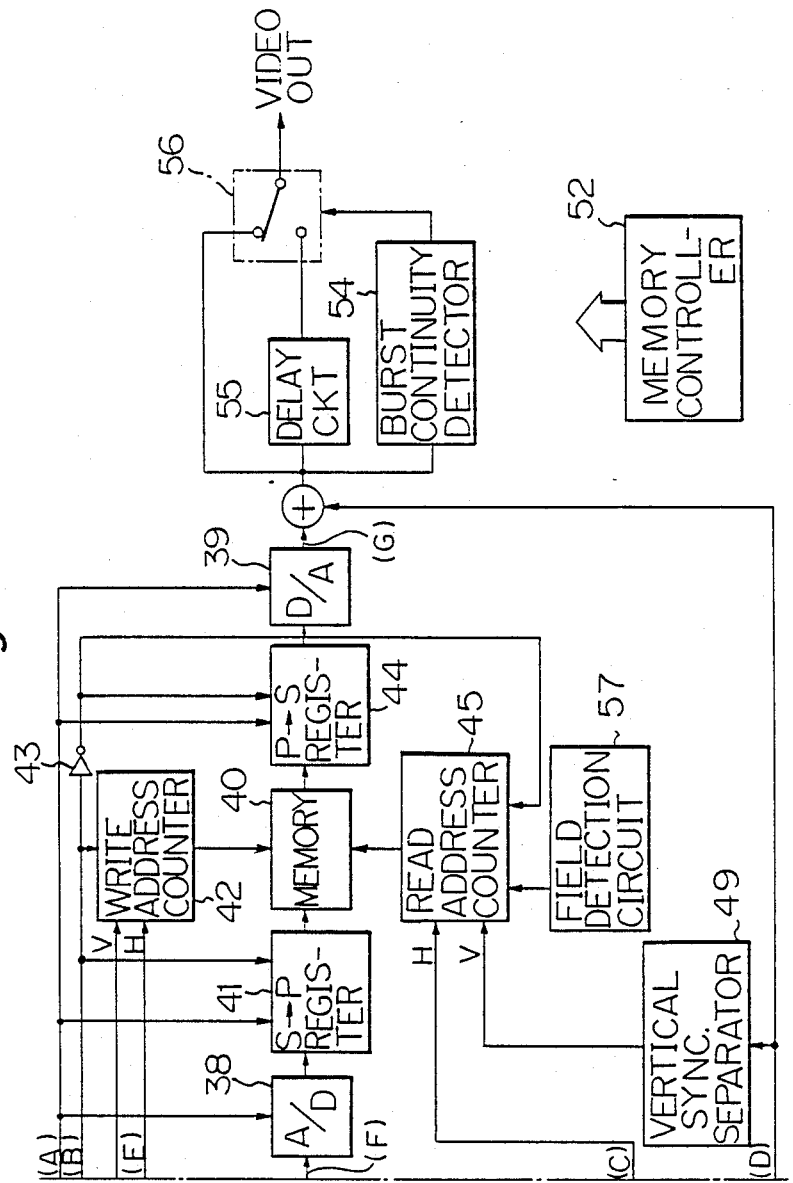

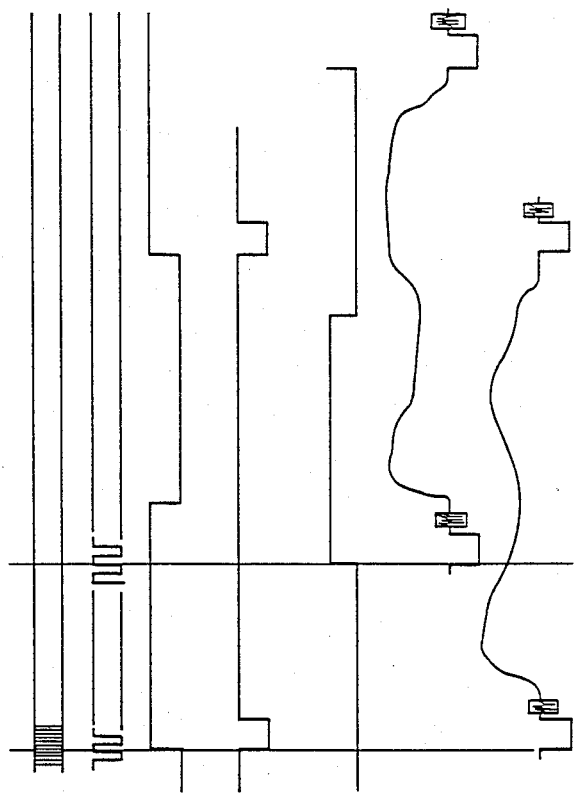

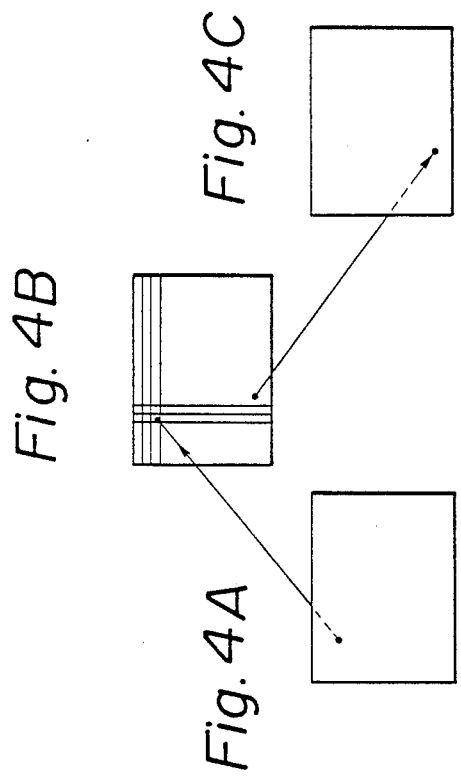

SYSTEM FOR PLAYING VIDEO INFORMATION RECORDING DISKS, CAPABLE OF SPECIAL PLAYBACK MODE OPERATION WITH A CLV DISK

This is a divisional of application Ser. No. 848,264, filed Apr. 4, 1986, now U.S. Pat. No. 4,743,979.

BACKGROUND OF THE INVENTION

1. Field of the Invention

The present invention relates to a system for playing back recorded video information, and more specifically to a system in which the so called special playback modes are enabled with the CLV (constant linear velocity) type disks.

2. Description of Background Information

The present invention relates to a video information playback system, and more specifically to a system for playing a disk-shaped recording medium carrying video information. Such recording media, i.e., video disks are generally classified into two types. One of which is the so called CAV (constant angular velocity) type and the other is the so called CLV (constant linear velocity) type. In disk playing systems adapted for playing both of these two types of disks, it is generally possible to execute special playback modes such as the SLOW mode, the STILL mode, the FAST mode which are performed by the so called track jump operation only when the disk being played is the CAV type.

In other words, these special playback mode operations were not possible with the CLV disks conventionally. The reason of this is as follows.

(1) In the CLV disks, positions of the recording tracks on which the synchronizing signal is recorded are not aligned in a radial direction of the disk, unlike the CAV disks. As a result of this difference, a time base servo control part of the playback system is adversely affected its phase control operation by the track jump operation in the case of the CLV disk. Thus, if a special playback mode is executed with the CLV disk, it is generally very difficult to avoid the fluctuation of time base which is generally of a large magnitude.

(2) Further, in a playback signal produced during a special playback mode, the horizontal synchronizing signal H and a vertical synchronizing signal V become discontinuous. As a result, the horizontal and vertical synchronization operations in a TV monitor system are not properly performed, to cause the rolling of the displayed picture in both horizontal and vertical directions, and generally of large magnitude.

With respect to the problem mentioned in the above paragraph (1), applicants of the present case have already proposed solutions which are described in Japanese Patent Applications 56-197193 (Provisional Publication No. 58-98881) and 59-173716.

The technique described in those patent applications is such that the phase of a reference signal at a time of the completion of the track jump operation with respect to the phase of the synchronizing signal contained in the playback signal is equalized with the phase at a time of the start of the track jump operation. In this way, the disturbance of time base as a result of the jump operations is quickly absorbed.

As for the second problem described in the paragraph (2) of the foregoing description, it is possible to solve the problem using a video memory system (or in other words, a frame synchronizer) which enables the synchronization of synchronizing signals contained in the playback signal with external clock signals. The video memory systems are constructed such that the video signal is transformed into a digital signal using a clock signal which is synchronized with the playback video signal, and the digitalized video signal is recorded at predetermined locations in a video memory. The recorded digital video signal is then read out by using a stable external clock signal. In this way, the horizontal and the vertical synchronizing signals H and V of the video signal are synchronized with stable synchronizing signals supplied from outside.

FIG. 1 is a block diagram showing an example of such a video memory system.

As shown in this figure, a playback video signal is provided from a disk playing system 1. A write clock signal which is synchronized with the horizontal synchronizing signal or the burst signal of the playback video signal is generated at a write clock signal generating circuit 2 and the video signal is transformed into a digital signal at an A/D (analog to digital) coverter 3 using the write clock signal generated by the write clock signal generating circuit 2. The thus obtained serial data are in turn supplied to an S-P register 4 for converting the serial data into parallel data. The operation of the S-P register 4 is such that serial data corresponding to m clocks are converted to parallel data at one time in accordance with a dividing clock signal which is produced at a divider 5 by dividing the above write clock signal by a number m. For instance, if the number m is 8, serial data corresponding to 8clocks are converted into parallel data at one time. The thus converted parallel data are in turn stored in predetermined address areas of memory 6.

On the other hand, on reading side, a read clock signal is produced at a read clock signal generating circuit 8 which is synchronized with the horizontal synchronizing signal or the burst signal of a reference synchronizing signal produced at a synchronizing signal generating circuit 7. Data in an address area of the memory 6 which is determined by this read clock signal are read out together, in synchronism with a divided clock signal which is obtained by dividing the read clock signal by a number 8 at a divider 9. Read out parallel data are then transformed into serial data at a P→S register 10, and further converted into an analog signal at an A/D converter 11. The analog signal produced at the A/D converter 11 is provided as an output video signal. In this way, a video signal which is synchronized with the above synchronizing signal can be obtained.

However, a problem which may occur in this circuitry is that the time base (the frequency of the horizontal synchronizing signal and the frequency of the subcarrier signal, and the like) is not necessarily exactly synchronized between the video signal to be stored and the reference synchronizing signal on the reading side. Therefore, there can be a case in which times of writing and reading of data into and from the memory become coincident with each other. In order to prevent such a problem, there is provided a controller 12 which excecutes the phase control of each clock signal when it is needed, and also control operations are provided so that the serial data on both of input and output sides are processed regularly.

Thus, if video memory systems are utilized, a write clock signal and a read clock signal are required respecitvely for writing and reading quantized digital data into and from the memory unit. Further the control circuit such as the control circuit 12, for controlling the phase of each clock signal at need, is also required. Thus, a number of peripheral circuits are required in conventional video memory systems.

As seen from the above, the special playback mode operation with the CLV disks are not a technically impossible task. However, it is necessary to combine the techniques of quickly absorbing the fluctuation of the time base which is caused by the track jump operation, and employing a video memory for synchronization so as to convert a discontinuous input video signal into a continuous output video signal.

However, by the combination of these prior art techniques, the circuit construction necessarily becomes complicated and large scaled. Therefore, it is not practical to adapt a circuit construction as the above described circuit in consumer products in view of their high cost.

SUMMARY OF THE INVENTION

The present invention has beem made in view of the points mentioned in the foregoing description, and an object of the present invention is to provide a video information reproducing system in which special playback mode operations for the CLV disk are possible by using a relatively simple circuit construction which is characterized by forming a prdetermined relationship between the disk playing system and the video memory system.

According to the present invention, the frequency of write and read clock signals in the video memory system are set at a multiple of a horizontal scanning frequency by a multiplication factor of n (n is an integer greater than 1). The clock signal is then divided by n to provide a reference signal for a time base servo system in the disk playing system.

BRIEF DESCRIPTION OF THE DRAWINGS

FIGS. 2A and 2B, when combined, are a block diagram showing a first embodiment of video information playback system according to the present invention;

FIG. 2C is a diagram showing a manner for combining FIGS. 2A and 2B;

FIGS. 3A through 3G are waveform diagrams of signals appearing at various points of the video information reproducing system of FIG. 2;

FIGS. 4A through 4C are diagrams showing interrelationship among a plane of reproduced picture, a plane of memory device, and a picture plane of a memory output signal;

FIG. 5C is a diagram showing a manner for combining FIGS. 5A and 5B.

DETAILED DESCRIPTION OF THE PREFERRED EMBODIMENT

Figure 1:
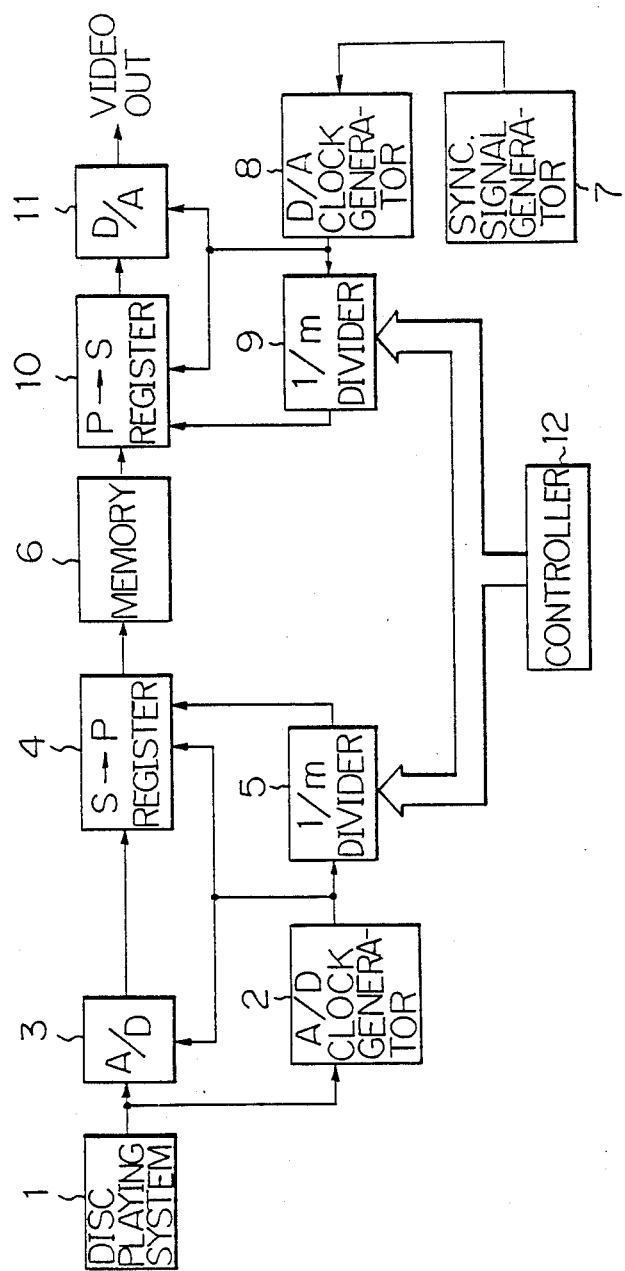
FIG. 1 is a block diagram showing the construction of a video memory system utilized in conventional systems.
Figure 2A:
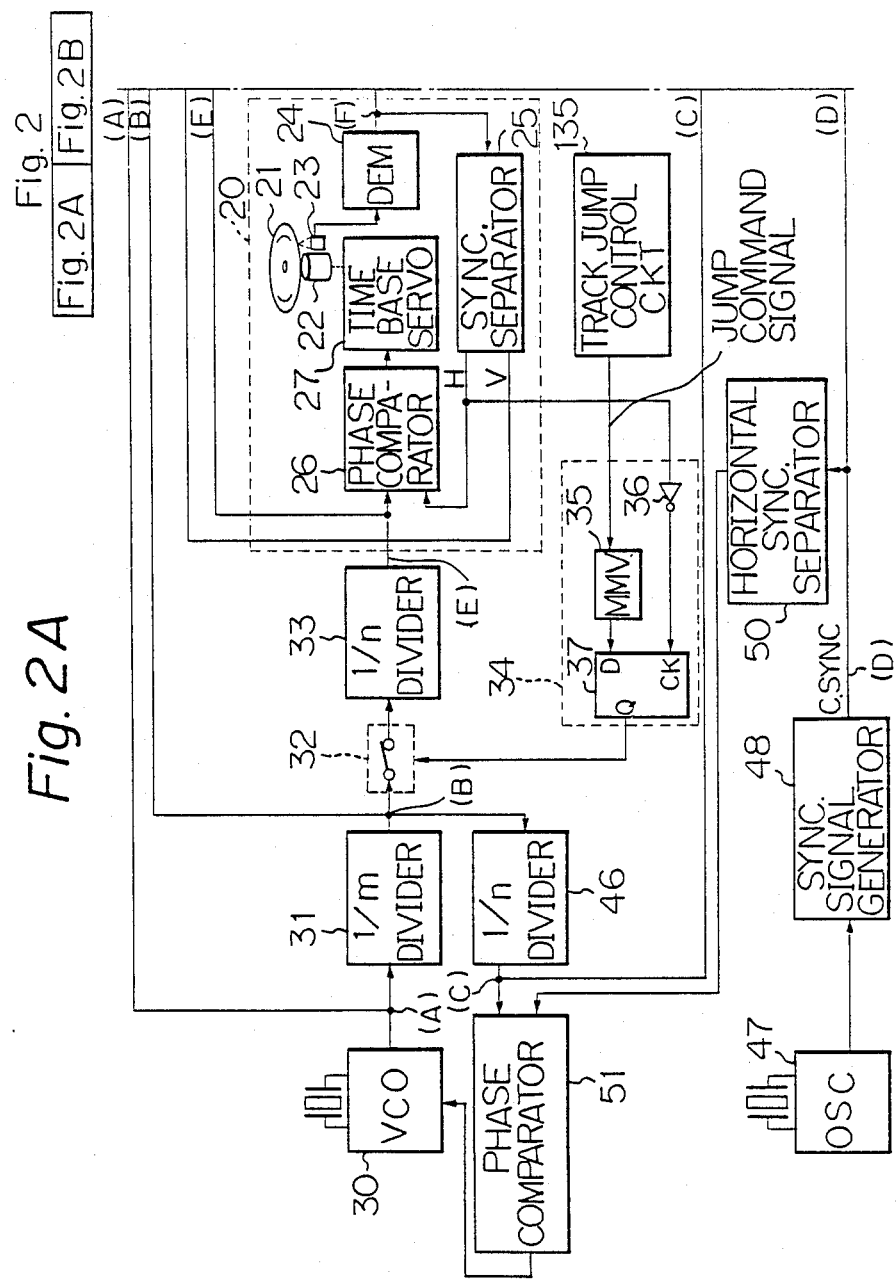

Referring to FIGS. 2A and 2B, the first embodiment of the video information playback system according to the present invention will be described in detail hereinafter.

FIGS. 2A and 2B, when combined together, show a block diagram of the first embodiment of the video information playback system according to the present invention. FIGS. 3A through 3G are waveform diagrams respectively showing signals (A) through (G) appearing in various points of FIGS. 2A and 2B.

In FIGS. 2A and 2B, the reference numeral 20 denotes a time base servo system and also a video signal processing system of a disk playing system.

The disk playing system has a structure to drive a video disk 21 by means of a spindle motor 22. When a video disk of CAV type is loaded, the spindle motor 22 drives the disk so that an angular velocity is maintained constant. On the other hand, when the disk loaded is the CLV type, the spindle motor 22 drives the disk in such a manner that a relative linear velocity of a spot of information reading light along a recording track is maintained constant. A pickup 23 is provided for reading video information carried by the video disk 21 and a read signal provided from the pickup 23 is supplied to a demodulation circuit 23 in which the read signal is demodulated. An output signal of the demodulation circuit 23 is output as a video signal and also supplied to a sync (synchronizing) signal separating circuit 25. In the sync signal separating circuit 25, a horizontal synchronizing signal and a vertical synchronizing signal contained in the playback video information signal are separated and then output to next stages. The horizontal synchronizing signal H is then supplied to a phase comparing circuit 26 in which a phase difference between the horizontal synchronizing signal H and a reference signal which will be described later is detected. A phase difference signal issued from the phase comparator 26 is supplied to a time base servo circuit 27, so as to control the speed of rotation of the spindle motor 22. Thus, the so called spindle servo system is formed by this time base servo circuit 22. Although only the spindle servo system is illustrated as the time base servo circuit 27, it also includes the so called tangential servo system using a tangential mirror and a CCD (charge coupled device).

The reference numeral 30 denotes a reference oscillator of a VCO configuration, which generates a reference clock signal (A) having a frequency of N (N is an integer greater than 1, and N=m×n) times the frequency of the horizontal scanning frequency fH (fH=15.734kHz). The reference clock signal (A) is then divided, at a dividing counter 31, by a dividing factor m (m is an integer greater than 1) to produce a divided clock signal (B). The divided clock signal (B) is selectively supplied to a dividing counter through a switch 32 which operates as a gate means. At the dividing counter 33, the divided clock signal (b) is further divided by a dividing factor n (n is an integer greater than 1), to produce a clock signal (E) having the frequency of horizontal scanning signal. The thus produced divided clock signal (E) is utilized as a reference signal of the aforementioned phase comparator 26, that is, a reference signal of a time base servo system in the disk playing system.

A control circuit 34 is provided to control the operation of the switch 32. During normal playback operations of the disk playing system, the switch 32 is maintained closed (turned on). On the other hand, when the track jump operation takes place for a special playback mode, the switch 32 is opened by the control circuit 34 at least during the track jump operation, to provide the divided clock signal (B) to the dividing counter 33. The control circuit 34 is, for example, made up of an MMV (monostable multivibrator) 35 which is triggered by a leading edge of a jump command signal supplied from a track jump control circuit 135, to produce a one-shot pulse signal having a predetermined pulse width, and a D flip-flop which receives this one-shot pulse signal and also receives, as a clock input signal (CK), the horizontal synchronizing signal H supplied from the synchronizing signal separating circuit 25 through an inverter 36. A Q output signal of this D flip-flop 37 is utilized as the control signal of the switch 32.

The reference pulse signal (A) produced by the reference pulse signal (A), is utilized as the time base standard of the servo system as mentioned above, and also supplied to an A/D converter 38 and a D/A converter 39 as a clock signal for executing an A/D conversion and a D/A conversion of the playback video signal from the disk playing system. Further, the reference pulse signal (A) is divided, at a dividing counter 31, by a dividing factor m. The thus produced signal is in turn supplied as a W/R (write and read) clock signal (B) to the S→P register 41 and a write address counter 42, and further to a P→S register 44 and a read address counter 45 through an inverter 43. During high level periods of this W/R clock signal (B) for example, the writing operation is performed in such a manner than an output signal of the registor 41 for converting serial data from the A/D converter 38 into a parallel data corresponding to m samplings, is transferred to the memory at one time. Conversely, for reading information, data corresponding to m samplings are read from the memory 40 and then transferred to the register 44 during low level periods of the W/R clock signal (B).

It will be appreciated from the above, in the disk playing system 20, the time base servo control operation is performed in accordance with the time base reference pulse signal (E) generated by dividing the reference pulse signal (A) generated at the reference signal oscillator 30. With this feature, the playback video signal (F) is synchronized with the time base reference pulse signal (E) provided as an output signal of the dividing counter 33. In other words, a predetermined phase relation is maintained. This also means that a predetermined phase relations is maintained between the playback video signal and the the reference pulse signal generated at the reference signal oscillator 30, and the W/R clock signal (B) provided as an output signal of the dividing counter 31.

Taking advantage of these phase relations, the video information is written while maintaining a predetermined and one to one correspondence between the picture plane and a memory plane, by utilizing the time base reference pulse signal (E) and the vertical synchronizing pulse signal separated from the playback video signal at the synchronizing signal separating circuit 25 for resetting the counter 42.

In addition, it is conceivable to utilize the horizontal synchronizing pulse signal separated from the playback video signal (F) at the synchronizing signal separating circuit 25 as a horizontal reset pulse signal of the write address counter 42. However, in that case, it is not possible to avoid a slight phase error between the reference time base pulse signal (E) and the playback video signal (F), because of a reason such as the drift of the synchronizing phase of the servo system. The phase relation between the W/R clock signal (B) and the reference time base pulse signal (E) is maintained constant by the dividing counter 33 and without indeterminateness. On the other hand, the relation of absolute positions between the playback video signal (F) and the W/R clock signal (B) is determined indirectly by the servo system of the disk playing system 20. Therefore, if the write address counter 42 is reset by the horizontal synchronizing pulse signal obtained from the playback video signal (F), a malfunction is very likely to occur because the write address counter is not necessarily reset at a time of completion of one cycle of W/R operation.

In view of the above described phase relations, the reference time base signal (E) is utilized as the horizontal reset pulse signal of the write address counter 42, so that the absolute phase relation to the W/R clock signal (B) is maintained, and also, there is an advantage that an adverse effects of noise components contained in the playback signal are avoided.

On the other hand, on reading side, the video data is read from the memory 40 during low level periods of W/R clock signal (B), and again converted into the analog signal by means of the D/A converter 39. An address counter 45 for determining the address of data to be read from the memory 40 is operated to count by using the W/R clock signal (B) as in the case of the write address counter 42. However, a divided pulse signal (C) obtained by dividing the W/R clock signal (B) at the dividing counter 46 by a factor of n is utilized as a horizontal reset pulse signal thereof. As a vertical reset pulse signal, a vertical synchronizing pulse signal is separated, at a vertical synchronizing signal separating circuit 49, from a composite synchronizing signal (D) which is generated at a synchronizing signal generating circuit 48 on the basis of a frequency signal having a frequency of 910 fH and generated at an oscillation circuit 47.

The horizontal synchronizing pulse signal contained in the composite synchronizing signal (D) is separated at a horizontal synchronizing signal separating circuit 50, and in turn supplied to a phase comparator 51 in which a phase thereof is compared with a phase of the dividing pulse signal (C) from the dividing counter 46. The phase comparator 51 is operated to control the oscillation frequency of the reference oscillator circuit 30 so that the phase of the horizontal reset pulse signal of the read addresss counter 45 and the phase of the composing synchronizing signal (D).

Accordingly, the horizontal and vertical reset pulse signals of the read address counter 45 are determed by the composite synchronizing signal (D) which is constant and continuous, independently of the operation of the disk playing system 20. Since the writing of data is, as mentioned above, performed such that the predetermined one to one correspondence is maintained between the video plane and the memory plane, a continuous video signal can be obtained by in turn reading data on the memory plane by means of the address counter 45 (see FIGS. 4A through 4C). In addition, FIGS. 4A, 4B, and 4C respectively show the plane of the picture played back from the disk playing system, the memory plane, and the picture plane of the memory output signal.

The above explanation has been made with respect to the normal playback operation (the so called PLAY mode operation). For playing back a CLV disk with the track-jump operations, according to the present invention, the frequency of the W/R clock signal of the memory 40 is set an n times the frequency fH of the reference time base pulse signal (E) of the servo system of the disk playing system 20. By turning off (opening) this switch 32 for supplying the W/R clock signal (B) to the dividing counter 33 during the period in which the jump operation is taking place, the time base servo system converges quickly so that the writing in the memory 40 is enabled. At the same time, the edges of the time base reference pulse signal (E) are synchronized with the edges of W/R clock signal (B) having a predetermined polarity, for instance, leading edges in the case shown in FIGS. 3A–3G.

In other words, in the case of FIGS. 3A–3G, the phase of the playback video signal (F) and the phase of the W/R clock signal (B) are made constant without regard to the track jump operation. Thus, fluctuation of the position of the horizontal signal of the video signal being written is prevented. Accordingly, by using the video signal (G) read from the memory 40, a stable picture which is free of the roll is obtained even during a playback mode which uses the track jump operation. Additionally, a memory controller 52 is provided for temporarily stopping the writing to the memory 40 in response to the track jump operation, or restarting the writing, in order to execute a special playback mode of the CLV. By the operation of this memory controller, a picture which is easy to see can be transmitted.

Another solution will be described hereinafter. Since the time base servo loop is closed until a time of the occurence of a track jump operation, the phase error signal produced at the phase comparator 26 has a value near to zero. Therefore, the following measure can be taken for maintaining the phase relation between the reference horizontal synchronizing pulse signal and the playback horizontal synchronizing pulse signal as the relation at a time immediately before the track jump operation. In this measure, the count operation of the dividing counter 33 is stopped after the start of the track jump operation. Subsequently, an output value of the dividing counter 33 is set or reset at a value (preferable 0) near to zero which forms a target value of the time base servo loop immediately before an end of the track jump operation. After this operation, the count operation of the dividing counter 33 is restarted in synchronism with the playback horizontal synchronizing pulse signal produced immediately after the end of the track jump operation. Thus, the occurence of the phase difference at the time of restart of the operation of the dividing counter 33 is prevented. When this type of configuration is adopted, a delay in the locking of the servo system is prevented even in the event that a drop out occurs immediately before the track jump operation, to produce an anomalous phase comparator output signal. This is because the reference horizontal synchronizing pulse signal is produced by using a value set at the dividing counter 33 after the start of the track jump operation so that the phase difference between the playback horizontal synchronizing pulse signal and the reference horizontal synchronizing pulse signal is maintained to be zero.

Hereinafter, the selection of the dividing factors m and n of the dividing counter 31 and 33 will be explained hereinafter, as an example for embodying the present invention. The factor m represents the number of samplings in one block for serial to parallel conversion of the quantized data. Normally, 4 or 8 is selected as the number m. On the other hand, the value m×n which determines the sampling frequency of the video signal which is necessary to be higher than 8.4 MHz. This is because the low frequency component of the video signal in the case of optical video discs is about 4.2 MHz, and a sampling signal whose frequency is twice the signal frequency is required according to the sampling theory. On the other hand, if the sampling frequency is too high, it becomes necessary to increase the memory capacity required for storing one field for one frame of the video information. In this point of view, a low sampling frequency is better than a high sampling frequency. According to an analysis of the present applicant, desirable numbers for the factors m and n are 8 and 70–74 respectively (m=8, n=70–74). If the frequency fH is 15.7342KHz under this condition, the sampling frequency is 8.81–9.31MHz.

In stages after the D/A converter 39, a composite synchronizing signal (G) is added to the video signal (G) read from the momory 40, at an adder circuit 53. This type of arrangement is advantageous because the horizontal synchronizing signal and the vertical synchronizing signal of the video signal is not recorded in the memory 40, to save the capacity of memory 40. Further, there can be a period in which the writing of the video information into the memory 40 during a special playback mode operation is inhibited by the operation of the memory controller 52. Therefore, the phase alternation of the burst signal component of the video signal can become irregular in the video signal (G) read from the memory 40. The discontinuity of phase alternation, or the reversed phase alternation, due to the above reason may result in a disturbance of the color synchronization. In order to avoid this problem, a burst continuity detection circuit 54 is provided. A selector switch 56 is provided for selecting either one of an input signal or an output signal of a delay line 55 having a delay time of 140n sec. By this feature, the continuity of burst alternation is maintained.

If the capacity of the memory used in the system is not more than for storing one field of video signal, there can be a case in which the order of the field is reversed between the writing side and the reading side. In order to avoid this problem, a field detection circuit 57 is provided to control the vertical start time of the read addresss counter 45 so that the vertical relation of the video signal does not change between fields on the reading side.

Thus, in the case of the video information playing system according to the present invention, the frequency of the W/R clock signal of the memory is set n times the frequency of the horizontal scanning signal. The W/R clock signal is then divided by n through a gate circuit which opens and closes in synchronizm with the synchronizing signal of the playback video signal, to produce a reference time base signal for the servo system in the disk playing system. With the thus constructed system, the disturbance of the time base servo system is prevented even when a CLV type disk is played with a special playback mode using the track jump operation. Further, the position of horizontal synchronizing signals during writing of the video informaiton into the memory is maintained always constant.

Thus, the special playback modes such as the SLOW, STILL, and FAST mode operations with the CLV disk which have been regarded to be impossible with the conventional technique is enabled by employing a very much simplified circuit construction.

So far, the description of the invention has been made in reference to a disk playing system in which the time base control operation is performed by the spindle motor and a subsequent stage of a tangential mirror and a CCD (charge coupled device) which form a very accurate time base control means.

Figure 5A:
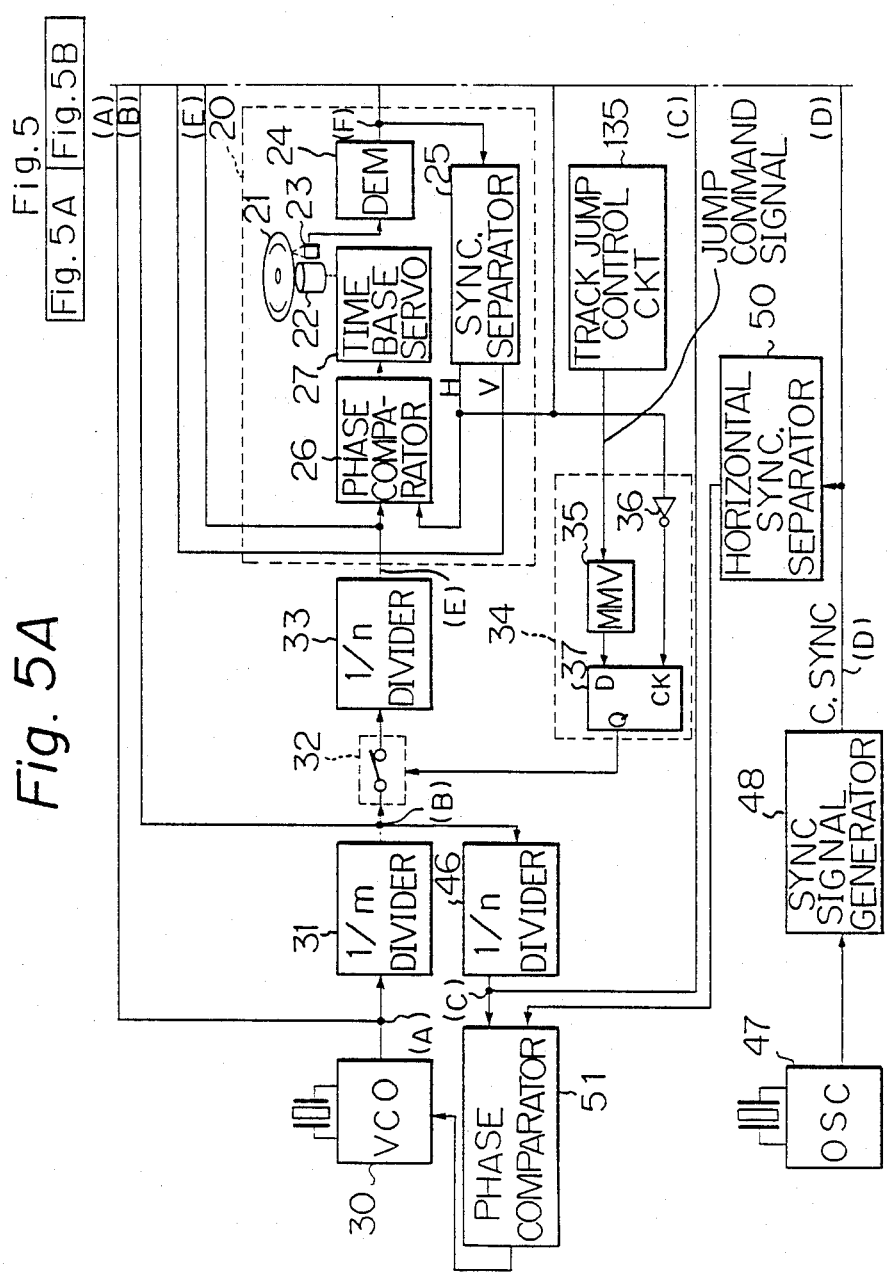
FIGS. 5A and 5B, when combined, are a blockdiagram of showing a second embodiment of the video information playbck system according to the present invention.
Figure 5B:
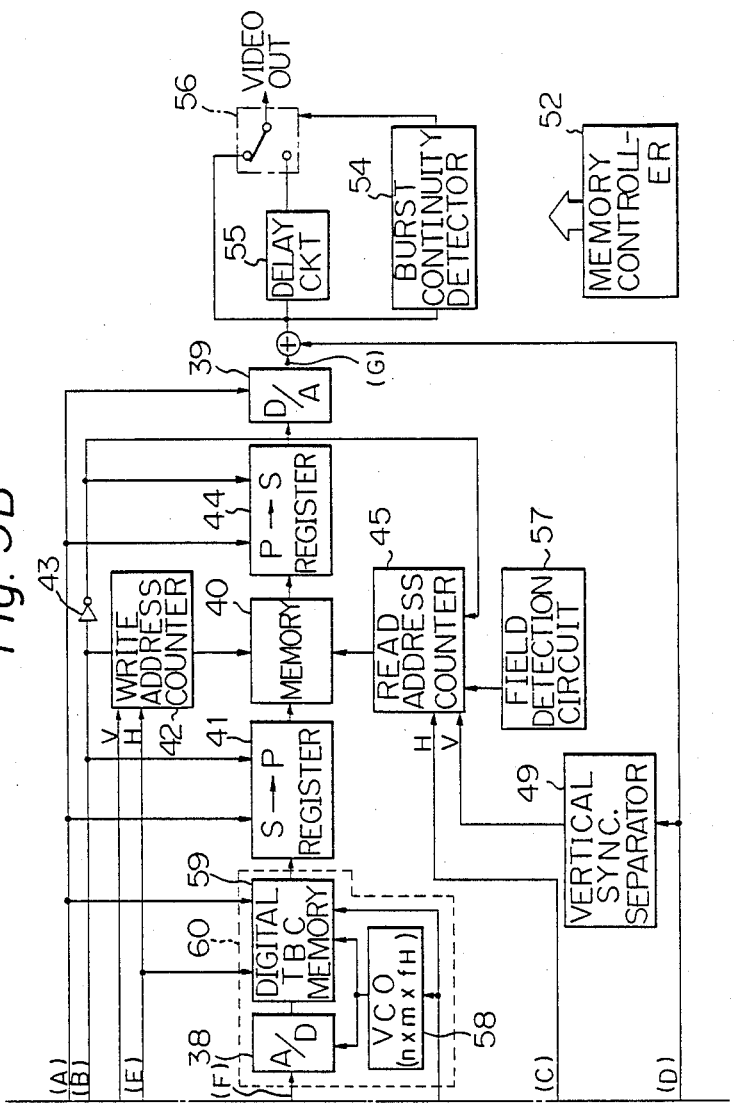

However, the application of the present invention is not limited to this type of circuit configuration. The second embodiment of the disk playing system according to the present invention, in which a digital type time base controller is utilized, will be explained hereinafter with reference to FIGS. 5A and 5B of the accompanying drawings.

As shown in the figure, a digital TDC (time base control) circuit 60 is provided after the demodulator 24. This digital type TDC circuit 60 includes a VCO (voltage controlled oscillator) 58 which receives the horizontal synchronizing pulse signal generated from the playback video signal and serves as the write reference signal. In accordance with the horizontal synchronizing pulse signal, the VCO 58 produces an oscillation signal whose frequency is m×n times the frequency of the horizontal synchronizing signal. This oscillation signal is used as a write clock signal synchronized with the playback video singal with jitter. The playback video signal demodulated at the demodulator 24 is supplied to the A/D converter 38, and in turn stored in a digital TBC (time base correction) memory 59 in accordance with the write clock signal supplied from the VCO 58. By reading the thus stored digital data from the TBC memory 59 using the reference clock signal of a stable time base. In this way, the time base correction operation is executed.

In this (second) embodiment, as reference clock signals at read time, the output signal (E) of the dividing counter 33 is used as the horizontal synchronization reference signal, as in the case of the previous embodiment using the combination of the tangential mirror and the CCD. As the read clock signal, the output signal (A) of the VCO 30 is utilized.

By the above explained construction, a video signal which is synchronized with the W/R clock signal of the memory 40 with a predetermined phase relation is supplied to the S-P register 41, to ensure the advantageous effects of the present invention.

What is claimed is:

1. A video information playback system for playing information from an information carrying disk having recording tracks comprising:
    a disk playing part which comprises,
    driving means for rotating said information carrying disk,
    reading means for reading information from said information carrying disk to produce a read video signal, and
    time base control means connected to said driving means for controlling a driving speed of said driving means to correct a time base fluctuation of said read video signal in response to a phase difference between a playback synchronizing signal contained in said read video signal and a reference timing signal;
    a video memory part which comprises,
    analog to digital converting means for converting said read video signal produced by said disk playing part into a digital signal to be memorized,
    writing address setting means for starting production of writing addresses which gradually change in synchronism with a writing clock signal in response to said reference timing signal,
    reading address setting means for starting production of reading addresses which gradually change in synchronism with a reading clock signal, said reading address being different from said writing address
    memory means for storing said digital signal at an address corresponding to said writing address and for issuing a digital signal from an address corresponding to said reading address, and
    digital to analog converting means for converting said digital signal read from said memory means into an analog signal which is to be produced as an output video signal using said reading clock signal;
    reference signal generating means for generating said reference timing signal; and
    means for synchronizing timings of said writing address setting means with said reference timing signal generated by said reference signal generating means.

* * * * *